US 8,112,421 B2

(12) United States Patent
Sun et al.

(10) Patent No.: US 8,112,421 B2
(45) Date of Patent: Feb. 7, 2012

(54) QUERY SELECTION FOR EFFECTIVELY LEARNING RANKING FUNCTIONS

(75) Inventors: Nan Sun, Beijing (CN); Qing Yu, Beijing (CN); Shuming Shi, Beijing (CN); Ji-Rong Wen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 314 days.

(21) Appl. No.: 11/781,220

(22) Filed: Jul. 20, 2007

(65) Prior Publication Data

US 2009/0024607 A1 Jan. 22, 2009

(51) Int. Cl.
*G06F 17/30* (2006.01)
(52) U.S. Cl. ............... 707/737; 707/748; 707/749
(58) Field of Classification Search .............. 707/749, 707/737, 748, E17.014, E17.017, 999.002, 707/999.006, 999.007, 999.11, 999.101, 707/999.107
See application file for complete search history.

(56) References Cited

U.S. PATENT DOCUMENTS

| | | | |
|---|---|---|---|
| 5,864,846 A * | 1/1999 | Voorhees et al. ............ | 1/1 |
| 6,892,189 B2 | 5/2005 | Quass et al. | |
| 6,917,932 B2 | 7/2005 | Chang et al. | |
| 7,158,970 B2 | 1/2007 | Chang et al. | |
| 2005/0065919 A1 | 3/2005 | Gotoh et al. | |
| 2005/0289199 A1 | 12/2005 | Aphinyanaphongs et al. | |
| 2006/0195406 A1 | 8/2006 | Burges et al. | |
| 2006/0195440 A1 | 8/2006 | Burges et al. | |
| 2006/0253428 A1 | 11/2006 | Katariya et al. | |
| 2007/0038618 A1 | 2/2007 | Kosciusko et al. | |
| 2007/0094171 A1 | 4/2007 | Burges et al. | |
| 2007/0203940 A1 * | 8/2007 | Wang et al. ............ | 707/103 R |

OTHER PUBLICATIONS

Massih Amini et al. "A Selective Sampling Strategy for Label Ranking", In European Conference on Machine Learning (ECML'06), 2006.

Hwanjo Yu "SVM Selective Sampling for Ranking with Application to Data Retrieval", Proceeding of the eleventh ACM SIGKDD international conference on Knowledge discovery in data mining, 2005.
Jue Wang et al. "Learning Ranking Function via Relevance Propagation", WWW'05, May 22-26, 2006, Edinburgh, United Kingdom.
Shivani Agarwal et al. "Learnability of Bipartite Ranking Functions", Proceedings of the 18th Annual Conference on Learning Theory, 2005.
Wensi Xi et al. "Learning Effective Ranking Functions for Newsgroup Search", Proceedings of SIGIR 2004, 2004.
Brinker, K.; "Active Learning of Label Ranking Functions"; $21^{st}$ International Conference on Machine Learning; Banff, Alberta, Canada; 2004.
Burges, C. et al.; "Learning to Rank Using Gradient Descent"; $22^{nd}$ International Conference on Machine Learning; Bonn, Germany; 2005; pp. 89-96.
Jarvelin, K. et al.; "IR evaluation methods for retrieving highly relevant documents"; $23^{rd}$ Annual International ACM SIGIR Conference on Research and Development in Information Retrieval; Athens, Greece; 2000; pp. 41-48.

* cited by examiner

*Primary Examiner* — Mohammad Ali
*Assistant Examiner* — Amanda Willis

(57) ABSTRACT

A learning system for a search ranking function model may include a computer program that iteratively refines the model using new queries and associated documents from an unlabeled training set. The unlabeled training set may include a set of queries for which the associated documents have not been labeled as "relevant" or otherwise labeled. The new queries may be selected based on a similarity to and an accuracy of each neighbor from a labeled training set, such as a labeled validation set. Upon selection, the documents associated with the new queries may be labeled. The new queries and their associated documents may be accumulated into a labeled training set, such as a labeled training set, and a refined model may be learned based on the augmented labeled training set. The model may be iteratively refined until it is determined that the model is adequate.

19 Claims, 5 Drawing Sheets

QUERY SELECTION FOR EFFECTIVELY LEARNING RANKING FUNCTIONS

BACKGROUND

Search engines may use ranking functions to determine an order in which documents are presented in response to a received query. Ranking functions may take a number of document features as input and provide a set of document rankings as output. Features may be described as attributes of a document that may be used by a ranking function to determine the rank of a particular document for a particular query.

Modern search engines may use a large number of features to rank documents, such as PageRank, term frequency, document length, etc. When a large number of features is used by a search engine, learning to rank (e.g., machine learning) may be an effective solution for building a ranking function model. To build and refine the model, learning solutions may use document labeling in which a human operator gives a score to each of the documents associated with a query on a scale ranging from "relevant" to "irrelevant". Such labeling efforts may be a time-consuming and expensive. Improperly limiting the number of documents used in the training process may decrease the effectiveness of the learned model.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A learning system for a search ranking function model supports iteratively refining the model by selecting new queries, and the documents associated with the selected queries, from an unlabeled training set. The unlabeled training set may include queries for which the associated documents have not been labeled (e.g., scored on a scale ranging from "relevant" to "irrelevant"), whereas a labeled training set and a labeled validation set may include queries for which the associated documents have been labeled.

New queries may be selected from the unlabeled training set based on a similarity to and an accuracy (or weakness) of each neighbor query from a labeled query set (e.g., a labeled validation set in a RankNet system or other machine learning system). Upon selection, the documents associated with the new queries may be labeled. The new queries and their associated documents may be accumulated into a labeled training set, and a refined model may be learned based on the augmented labeled training set. The model may be iteratively refined until it is determined that the model is adequate.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
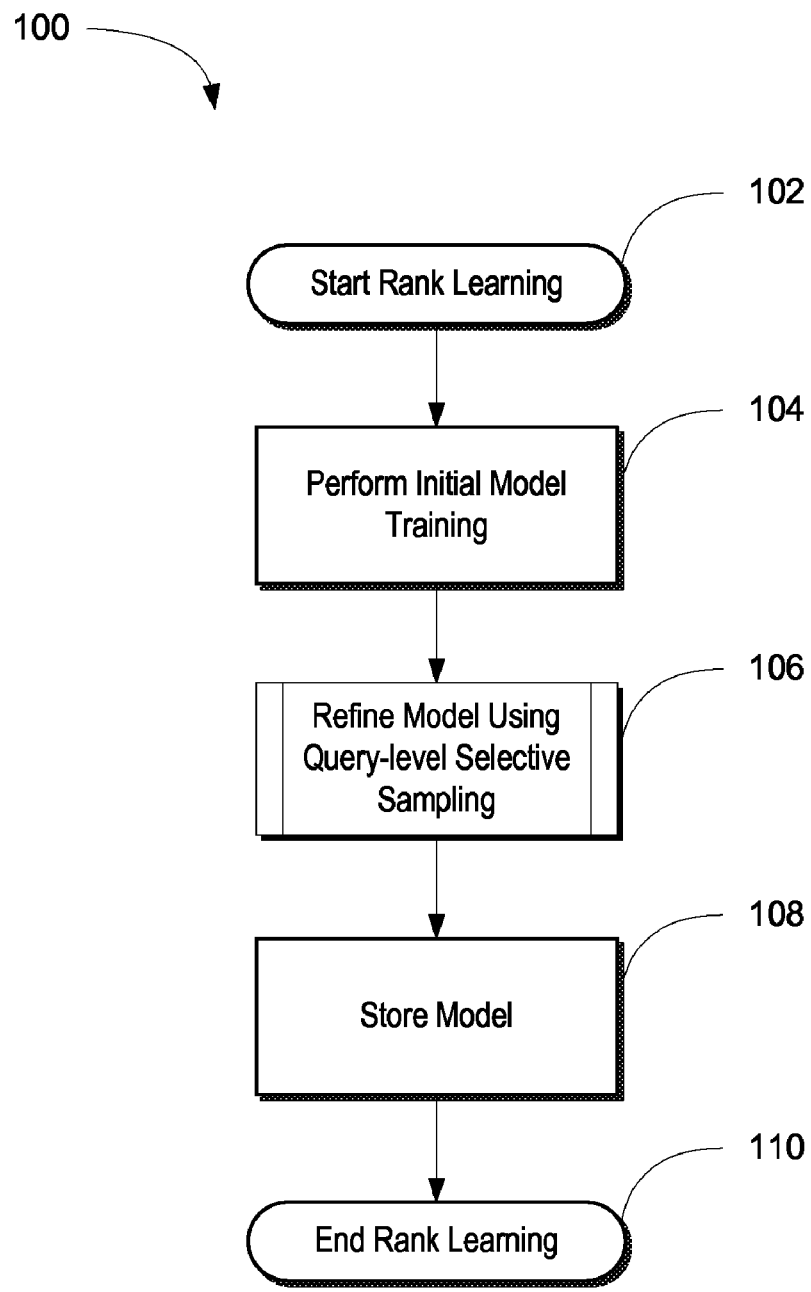
FIG. 1 shows a process of learning a ranking function model.
Figure 2:
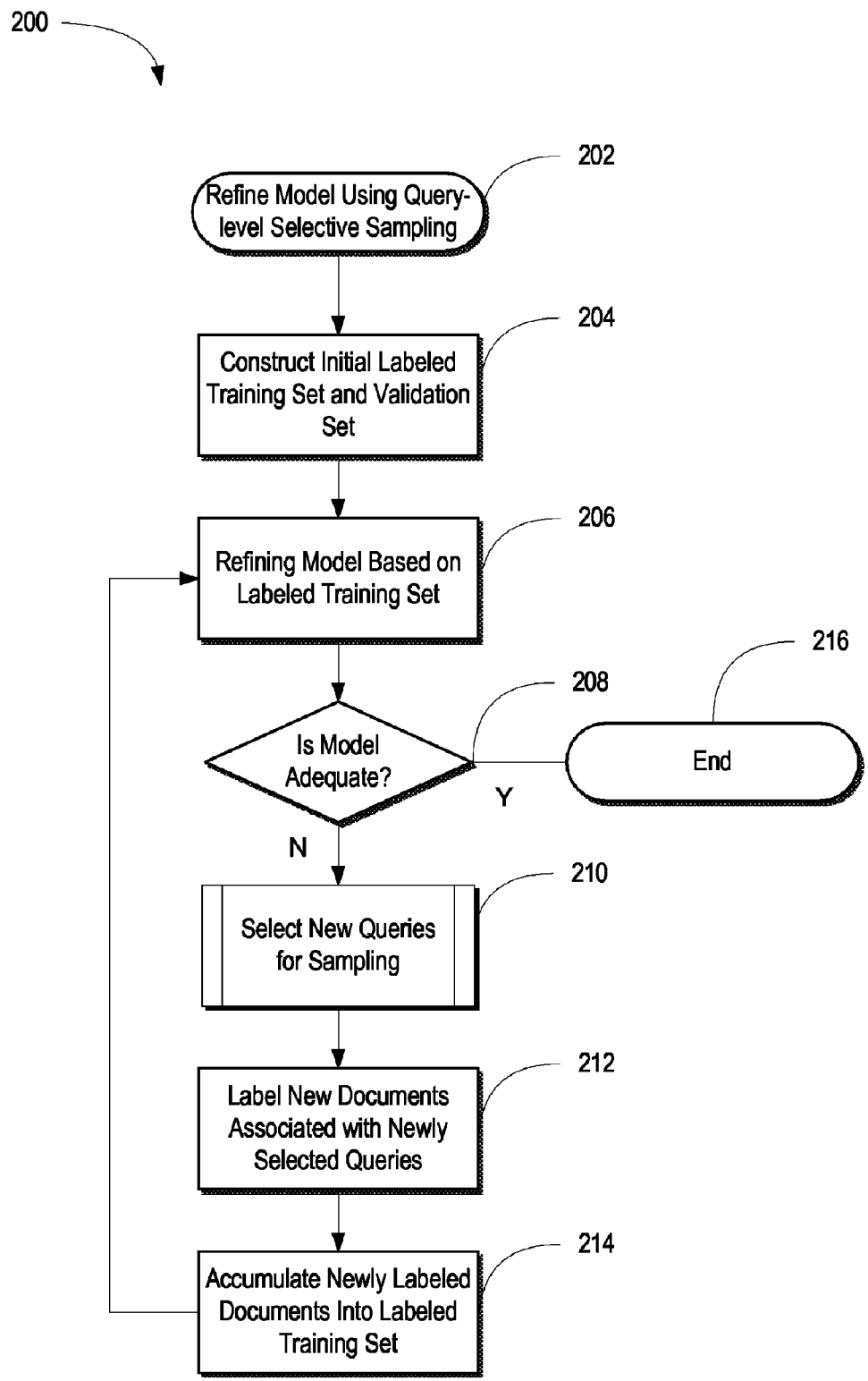
FIG. 2 shows a process of refining a model using query-level selective sampling.
Figure 3:
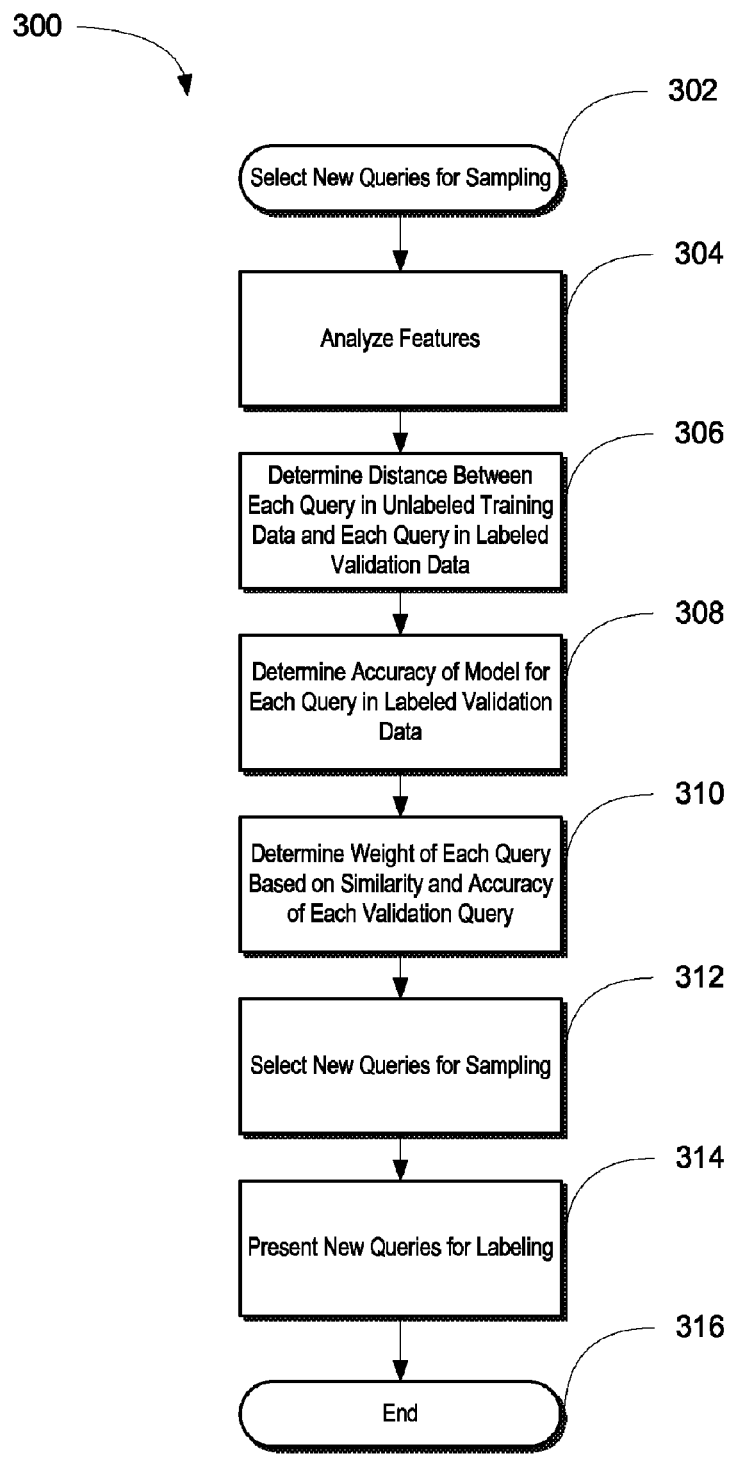
FIG. 3 shows a process for selecting new queries to use in the query-level selective sampling.

By way of overview, FIGS. 1-3 may be viewed as related process diagrams. Specifically, FIG. 2 represents a process that may be invoked at step 106 of FIG. 1, and FIG. 3 represents a process that may be invoked at step 210 of FIG. 2. FIGS. 2 and 3 are exemplary, and other suitable processes may be used instead of or in addition to the exemplary processes, as described in greater detail below.

FIG. 1 shows an overview process of learning a ranking function model, which may be referred to as a model. The model may be used, for example, in a search engine to rank associate documents with a query and rank associated documents presented to a user in response to a received query. The method involves performing 104 initial model training, The initial training for the model may be implemented in a variety of ways, including selecting a predetermined number of queries (e.g., 100 or 1000), labeling their associated documents (e.g., scoring the associated documents for relevance to a given query and/or scoring the documents for relevance in a query independent manner), and learning a model from the documents. Learning based on the labeled training set may be implemented using any suitable techniques, including large margin approaches, constraint classifiers, ordinal regression methods based on Gaussian Process (GP), boosting-based algorithms, RankNet, and/or other algorithms and applications.

The method also includes refining 106 the model using query-level selective sampling. Query-level selective sampling may involve determining which queries to select for learning based on characteristics of the query, and treating characteristics of documents associated with a query as characteristics of the query itself. For example, if a query-level selective sampling technique involves selecting the queries with high term frequency documents, an aggregate term frequency (e.g., average, mean, standard deviation of the mean, etc.) may be computed for each of the queries based on the term frequency values of their associated documents. FIG. 2 depicts an exemplary process for refining 106 the model using query-level selective sampling, although other algorithms may be used additionally or alternatively. Furthermore, refining 106 may be conducted in coordination with performing 104 the initial training or the initial training may have occurred previously (e.g., the product of a previous process of learning a ranking function model).

Once the model is refined using query-level selective sampling, the model may be stored 108 or otherwise made available (e.g., transmitted across a network to a remote computer system) for use within a search engine and/or for further learning.

FIG. 2 shows a computer-implemented process of refining a model using query-level selective sampling. In particular, FIG. 2 depicts a computer-implemented method for refining a ranking function model using characteristics of a set of unlabeled queries and a set of labeled queries. In one embodiment, process 200 may be a sub-process of FIG. 1 (e.g., a sub-process for the refining 106 step).

Regarding the distinction between labeled and unlabeled query sets, it is understood that query-level selective sampling methodology may treat a query and its associated document as a related entity. For example, a query may have a labeled/unlabeled attribute (e.g., a query may be labeled when its associated documents have been labeled), one or more feature values (e.g., a feature value which may be based on an aggregate or statistical feature value of the associated documents), and/or other characteristics based on the characteristics of documents associated with the query.

Turning to the elements depicted on FIG. 2, the method may begin with constructing 204 an initial labeled training set and labeled validation set. This step may be performed in coordination with the following steps, or in advance of the following steps (e.g., the initial training set and validation set may be constructed during of a previous rank learning process). Constructing 204 the initial training set and validation set may also involve determining the aggregate characteristics of the query features in the training set. An aggregate characteristic may be described as the feature characteristics of a query that are based on (aggregated, statistically represented, etc.) the feature values of a query's associated documents. The aggregate characteristics may be stored as part of the labeled data set, stored separately, periodically determined as needed, and/or managed using other techniques.

The learning steps 206 to 214 may be performed iteratively until a predetermined condition is met at step 208. Refining 206 the model based on the labeled training data set involves refining the model based on the labeled queries using one or more suitable algorithms (e.g., large margin approaches, constraint classifiers, ordinal regression methods based on Gaussian Process (GP), boosting-based algorithms, RankNet, etc.).

Determining whether the model is adequate 208 may be based upon performing a predetermined number of iterations through the learning steps, determining whether output of the model (e.g., the ranking of documents in response to a received query is adequate) meets a threshold. The threshold may be any suitable analysis of the generated output, such as a determination of whether the output exactly matches a predetermined output, an analysis using an information retrieval metric such as mean average precision, normalized discounted cumulative gain, precision at 10, and additional or alternative analysis methods.

Selecting 210 at least one new query from the unlabeled queries may be based on at least one aggregate characteristic of the unlabeled queries. In one embodiment, the aggregate characteristics of similarity to and accuracy of each labeled neighbor query (e.g., from a validation data set) may be used, as described in greater detail below with respect to FIG. 3. Other techniques for selecting queries based on aggregate characteristics may also be used in addition to or instead of the similarity to and/or the accuracy of each labeled query.

Labeling 212 a set of documents associated with the newly selected query (or queries) may involve assigning, by a human operator, a degree of relevance between the newly selected query (or queries) and each associated document. For example, for a given unlabeled query q, each of the documents associated with q may be labeled (e.g., classified as relevant or not, assigned a score on five degree scale from "perfect" to "bad").

Accumulating 214 the newly labeled documents into the labeled training set may increase the amount of data available during the next refining 206 step. The accumulation may be implemented by physically moving documents and/or records, updating a data store to modify a status (e.g., modifying a "labeled" field to true), or be implemented using other techniques.

It is understood that the sequence of steps depicted in FIG. 2 may be modified to achieve similar results. For example, constructing 204 the initial labeled training set may be replaced by a step of receiving an initial labeled training step. The sequence of the learning steps may be modified such that selection 210, labeling 212, and accumulation 214 occur before refining 206 and the determination step 208, which changes whether refining 206 occurs before or after accumulation 214 during a given iteration.

It is further understood that refining the model using query-level selective sampling may be implemented using algorithms instead of or in addition to the algorithm depicted in FIG. 2. For example, although the depicted algorithm is an iterative algorithm based on some determination of whether the model is adequate, a non-iterative approach may be used. One way in which a single pass process may be implemented is by selecting 210 a set of new queries for sampling, labeling 212 the new documents associated with the newly selected queries, accumulating 214 the newly labeled documents into the labeled training set, and refining 206 the model based on the labeled training set. After a single pass through the algorithm, the model may be refined and the process may be complete. Additional steps may be removed and/or added as appropriate.

Step 210 of FIG. 2 may be implemented by a number of algorithms, including an exemplary algorithm depicted in FIG. 3. Other techniques of selecting new queries for sampling may be used instead of or in addition to the depicted process. Additional techniques are described following the description of FIG. 3.

Turning to FIG. 3, a process for selecting new queries to use in the query-level selective sampling is shown. In one embodiment, one or more queries may be selected from the unlabeled queries based on a similarity to and an accuracy of each labeled query in a validation data set or other suitable data set. Implicit in this selection process is analyzing 304 the features of the documents associated with each of the queries. This analysis may occur at any point in a learning process (e.g., at step 204 of FIG. 4 instead of or in addition to step 304) as long as it occurs prior to step 306. In one embodiment, this analysis may involve the determination of a plurality of feature values for each of the documents associated with a given query, and then statistically summarizing or aggregating these values. These values may be represented in a matrix (A) having feature values on one dimension and documents on another dimension for each labeled query and each unlabeled query, as depicted below:

$$A = \begin{pmatrix} d_{f_{11}} & d_{f_{12}} & \cdots & d_{f_{1m}} \\ d_{f_{21}} & d_{f_{22}} & \cdots & d_{f_{2m}} \\ \cdots & \cdots & \cdots & \cdots \\ d_{f_{n1}} & d_{f_{n2}} & \cdots & d_{f_{nm}} \end{pmatrix}_{(n \times m)}$$

This matrix represents an n by m matrix in which df11 represents the feature value of feature 1 for document 1, df12 represents the feature value of feature 2 for document 1, df21 represents the feature value of feature 1 for document 2, etc. These features may be term frequency, document length (the number of words in the document), PageRank, and/or any other feature that may be used by a ranking function model.

Because each query may have a different number of associated documents, it may be appropriate to transform the matrixes having non-uniform dimensions into vectors having a uniform length (e.g., a length equal to the number of features under evaluation, a length equal to a multiple of the number of features, etc.). In one embodiment, the process may involve creating a vector for each matrix, the vector having at least one aggregate or statistical measure per feature summarizing the feature values for the multiple documents corresponding to each query. For example, each feature may have a mean value which is calculated based on the mean of the feature values of the associated documents. Instead of or in addition to a mean value, each feature may have a standard deviation of the mean which is calculated based on the standard deviation of the mean of the feature values of the associated documents.

By way of specific example, if three features are considered, such as term frequency (tf), document length (dl), and page rank (pr), for an unlabeled query q having five associated documents and a labeled query v having three associated documents, the following matrixes may be generated during the analyzing 304 step:

$$q = \begin{pmatrix} 10, & 100, & 0.5 \\ 5, & 1000, & 0.8 \\ 20, & 400, & 0.4 \\ 10, & 2000, & 0.2 \\ 1, & 40, & 0.5 \end{pmatrix}$$

$$v = \begin{pmatrix} 15, & 200, & 0.1 \\ 8, & 500, & 0.2 \\ 14, & 300, & 0.5 \end{pmatrix}$$

The following equations may be used to determine the mean ($\mu$) and the standard deviation of the mean ($\sigma$) for a given feature (i):

$$\begin{cases} \mu_i = \frac{1}{n} \sum_{j=1}^{n} d_{fij} \\ \sigma_i = \sqrt{\frac{1}{n} \sum_{j=1}^{n} (d_{fij} - \mu_i)^2} \end{cases}$$

Determining the mean and the standard deviation of the mean for each of the features may yield a vector having a length of six to store the statistical measures for each of the features (e.g., [$\mu_{tf}$, $\sigma_{tf}$, $\mu_{dl}$, $\sigma_{dl}$, $\mu_{pr}$, $\sigma_{pr}$]):

q=[9.2, 7.1, 708, 815, 0.48, 0.22]
v=[12, 3.8, 333, 152, 0.12, 0.077]

Other statistical and/or aggregate representations of the feature values may be used in addition to or instead of the mean and the standard deviation of the mean (e.g., average, median, skewness, kurtosis, highest value, etc).

Determining a distance 306 between each query in the unlabeled training data and each query in the labeled validation data may involve determining a similarity value for a query based on an aggregate associated document feature value. More specifically, determining a distance value (also referred to as similarity) for a given labeled query may be determined by comparing one or more aggregate feature values of each of the unlabeled queries to one or more aggregate feature values of each of the labeled queries.

In one embodiment, the differences may be squared and then summed, and the square root of this sum may be used as the distance. Continuing with the exemplary queries q and v above, the distance between the queries may be determined by the following expression:

$$d(q, r) = \sqrt{\sum_{i=1}^{2m} (q_i - r_i)^2}$$

A nearest neighbor may be the labeled query having the smallest calculated distance (d) from the equation above. Other methods of calculating a similarity between two queries may also be used.

It is noted that i is incremented from 1 to 2 m, where m is the number of features under evaluation, because there are two statistical measures per feature (mean and standard deviation of the mean). Accordingly, if more or fewer statistical measures per feature are used, the equation may be adjusted accordingly (e.g., increment to 1 m if one statistical measure per feature is used, increment to 3 m if three statistical measures per feature are used, etc.).

Determining an accuracy value 308 (S) of the model for ranking the labeled associated documents of each of the labeled queries may involve any suitable information retrieval metric, including mean average precision, normalized discounted cumulative gain, precision at 10, etc.

Determining a weight 310 based on the similarity value and the accuracy value may be implemented by multiplying the distance value d(q,v) by the accuracy value (S) such that:

$$w(q)=d(q,v)\cdot Sv$$

Selecting the new query 312 based on the determined weight of each unlabeled query may involve finding the query (or predetermined number of queries) having the lowest determined weights as the new query. The documents associated with the new queries may be presented 314 for labeling (e.g., identified on a generated list so that a human operator can look up the documents and label them, presenting the documents to the human operator in an automated manner, moving the new documents into a predetermined directory in a file system, or otherwise presented for labeling).

Figure 4:
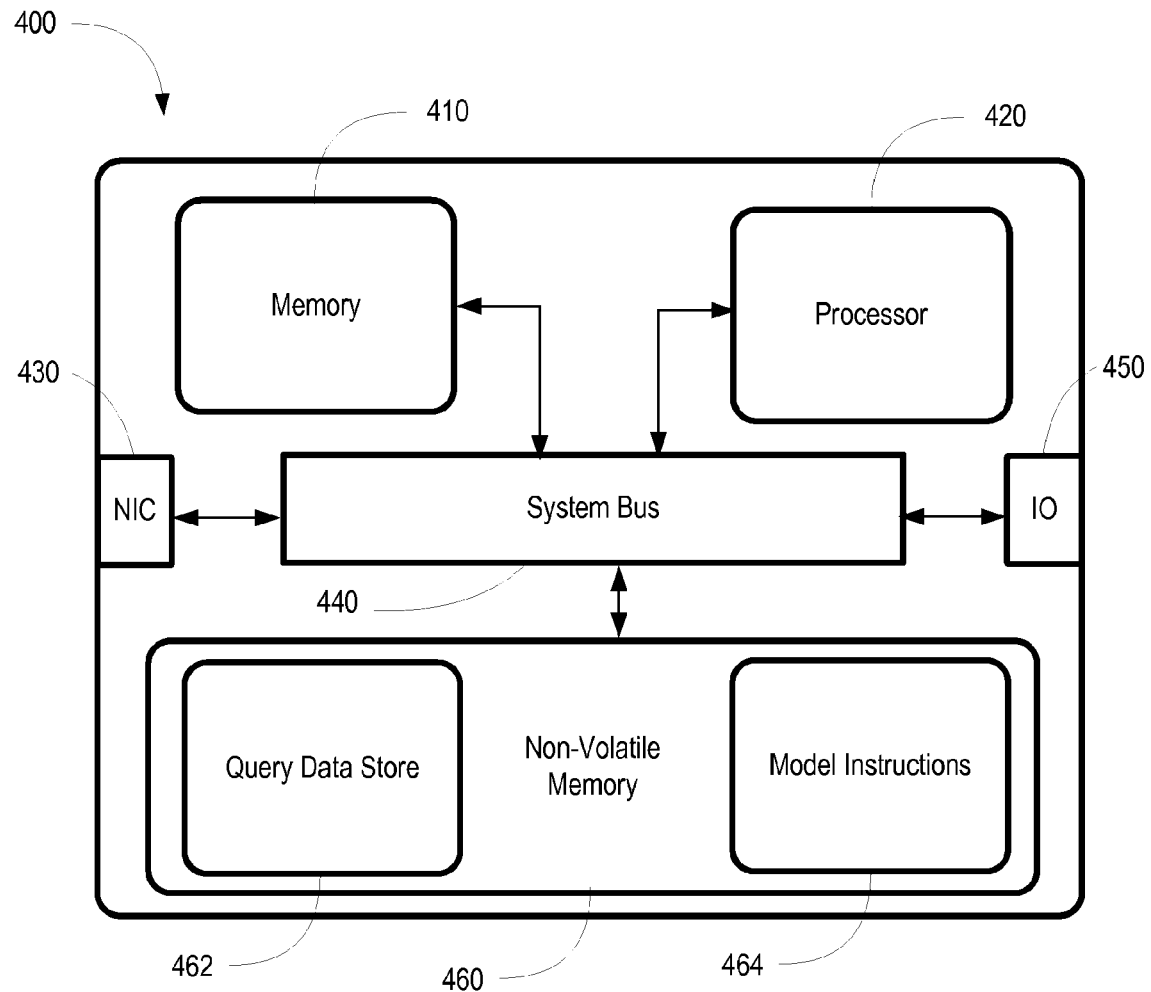
FIG. 4 depicts an exemplary computer system that may be used for learning the ranking function model.

Turning now to a hardware example, FIG. 4 depicts an exemplary computer system 400 that may be used for learning a ranking function model. The computer system 400 may include a memory device 410, such as random access memory, a processor 420, such as a microprocessor, a network interface 430, such as a network interface card, an Input/Output communication port 450, such as a USB port, and a system bus 440 that interconnects the components of the computer system 400. Additionally, the computer system 400 may include non-volatile memory 460 having computer readable data including a query data store 462 and model instructions 464, which may be stored on a file system, in a database, or otherwise. Model instructions 464, when executed by the processor 420, may serve as a modeling engine for ranking an associated subset of documents returned for a received query.

The query data store 462 may have a set of queries, each query having a status as labeled or unlabeled and additionally a status as training or validation (e.g., as used by RankNet). Additionally, the query data store may include a set of documents, each document associated with at least one query and each document having one or more feature values. For example, each document may be associated with a query in a one-to-many manner (e.g., in which each document is associated with one query, and each query has one or more associated documents), a many-to-many manner (e.g., in which each document is associated with one or more queries, and each query is associated with one or more associated documents), or otherwise related.

Query data store 462 may also include a set of relevance relationships between the set of documents and the set of queries. The relevance relationships may be provided in-line with the feature values (e.g., as an extra field in a database table), in-line with a document-to-query junction table (e.g., as an extra field in a junction table for a many-to-many implementation), or otherwise provided. An exemplary collection of data structures that may be used in the data store 462 is described below with respect to FIG. 5.

Non-volatile memory 460 and memory 410 are both examples of computer readable storage media. By way of example, and not limitation, computer readable storage media may include volatile and non-volatile, removable and non-removable media implemented in any method or technology for storage of information such as computer readable instructions, data structures, program modules, or other data. Computer readable storage media includes, but is not limited to, RAM, ROM, EEPROM, flash memory, or other memory technology, CD-ROM, digital versatile disks (DVD) or other optical storage devices, or any other medium which can be used to store the desired information and which can be accessed by computer system 400.

With respect to FIG. 4, a computer readable storage medium (e.g., non-volatile memory 460 and/or memory 410) may have computer-readable instructions for selecting new queries for sampling. These new queries may be used to improve an effectiveness of the modeling engine. The selecting process may include determining a similarity between an unlabeled query and each labeled neighbor query (e.g., for a labeled validation set) and determining an accuracy of the model for each of the unlabeled queries. Based on the determined similarity to and accuracy of the labeled neighbor query, a set of weights may be determined for the unlabeled query. A set of new queries may be selected based on these weights (e.g., the X smallest weights are selected, where X is an integer, or queries having a weight lower than a predetermined number). These selected queries may then be presented for labeling.

Figure 5:
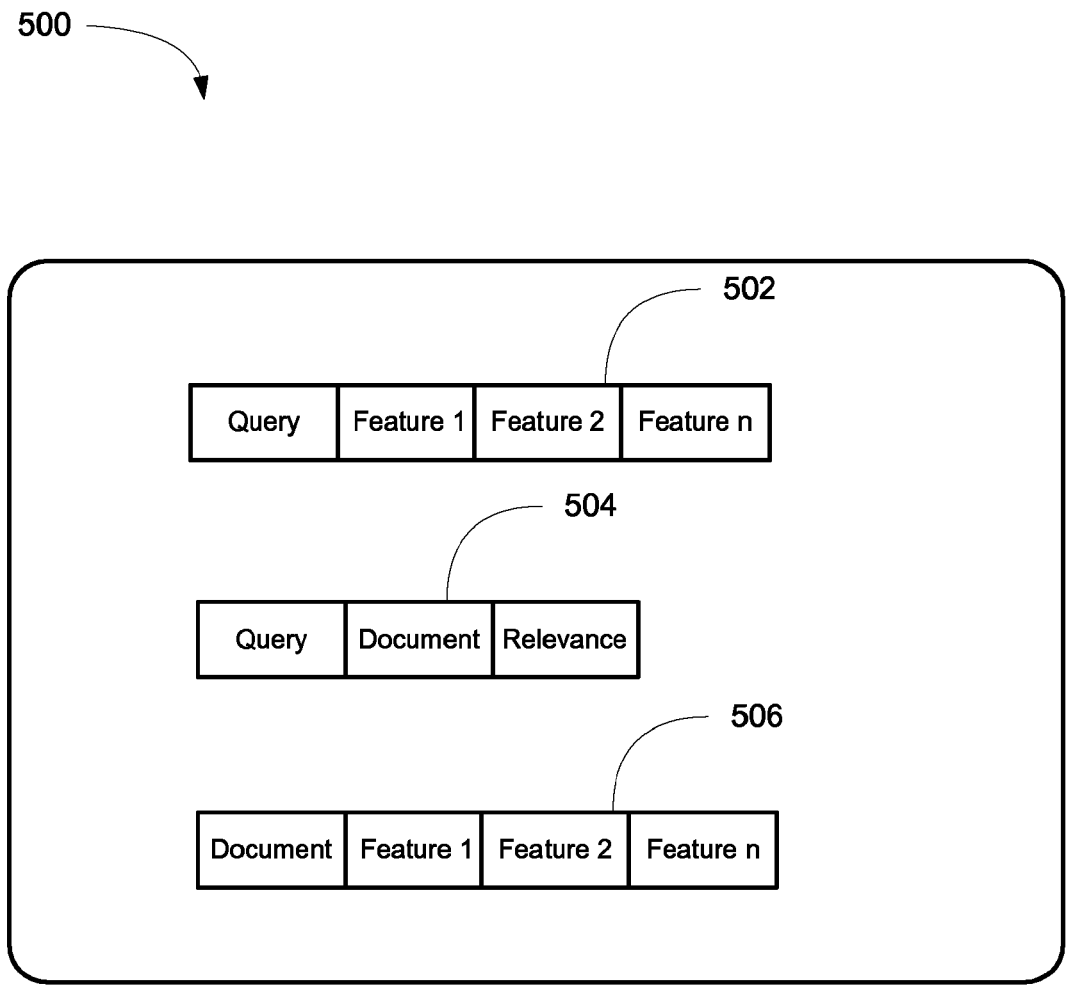
FIG. 5 depicts an exemplary data structure for labeled query data used by a ranking function model learning system.

FIG. 5 depicts an exemplary, logical data structure 500 for validation and/or training data used by a ranking function model learning system. Specifically, the data structure 500 includes a query data set 502, a relevance data set 504, and a document data set 506. These data sets may be implemented in a relational database (e.g., query data set 502 may be implemented as a table in the database), they may be implemented in an extensible Markup Language (XML) format (e.g., query data set 502 may be implemented as an XML document), or they may be otherwise implemented.

The depicted data structure 500 may support a single document being associated with multiple queries because the relevance value is stored in the relevance data set 504. In an alternative embodiment, the relevance value may be added as an attribute of the document data set 506.

Query data set 502 may include one or more aggregate feature values (e.g., mean, standard deviation of the mean, etc.) of the associated document feature values of document data set 506. These aggregate characteristics values may additionally or alternatively be determined as needed, and otherwise determined or stored.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Furthermore, although the context for the disclosed system and method are for text search, the system and method may operate outside the text search context, such as video search, picture search, audio search, and other types of search and areas of information retrieval.

The invention claimed is:

1. A computer-implemented method for refining a ranking function model the method comprising:
   storing an unlabeled training set comprising a plurality of unlabeled queries and a plurality of unlabeled documents associated with the plurality of unlabeled queries;
   storing a labeled validation set comprising a plurality of labeled queries and a plurality of labeled documents associated with the labeled queries, the labeled documents being labeled to reflect relevance to the associated labeled queries;
   iteratively performing learning steps including:
       determining similarity values between the unlabeled documents associated with the unlabeled queries and the labeled documents associated with the labeled queries;
       determining accuracy values of the model for ranking individual associated labeled documents of associated labeled neighbor queries in the labeled validation set; and
       determining weights of the unlabeled queries based on the similarity values and the accuracy values;
       selecting a first query, from the unlabeled training set of unlabeled queries to present to a user for labeling, wherein the first query is selected based on the similarity values of the unlabeled documents associated with the first query to the labeled documents associated with the labeled queries, and wherein the first query is selected based on the determined weights of the unlabeled queries;
       presenting the selected first query to the user for labeling of individual documents associated with the selected first query to provide newly labeled documents, wherein the set of documents associated with the first query are presented for the labeling;
       accumulating the newly labeled documents into a labeled training set of labeled documents;
       learning a refined model based on the labeled training set; and
       determining whether the refined model is adequate; and
   storing the refined model.

2. The computer-implemented method of claim 1, wherein the determining whether the refined model is adequate comprises determining whether an output of the refined model meets a predetermined threshold.

3. The computer-implemented method of claim 1, wherein the refined model is determined to be adequate when a predetermined number of iterations of the learning steps have been executed.

4. The computer-implemented method of claim 1, wherein:
the similarity values are determined based on distance values for individual labeled neighbor queries by calculating a sum of one or more differences between a set of unlabeled query feature values and a set of labeled neighbor query feature values from the labeled validation set;
the computer-implemented method further comprising:
determining accuracy values of the model for each individual labeled neighbor query using an information retrieval metric; and determining weights by multiplying the distance values by the accuracy values;
wherein the first query is selected from the unlabeled training set of unlabeled queries based on a determination that the first query has the lowest determined weight of the unlabeled queries in the unlabeled training set.

5. The computer-implemented method of claim 4, wherein the information retrieval metric is a normalized discounted cumulative gain metric or a mean average precision.

6. The computer-implemented method of claim 4, wherein the distance values are determined by:
creating a matrix for each labeled query in the labeled validation set and each unlabeled query in the unlabeled training set, each matrix having feature values on one dimension and documents on another dimension;
creating a vector for each matrix, the vector having at least one statistical measure per feature summarizing the feature values for individual documents associated with each labeled query in the labeled validation set and each unlabeled query in the unlabeled training set; and
determining the distance values by calculating differences between individual statistical measures of individual created vectors.

7. The computer-implemented method of claim 6, wherein the at least one statistical measure comprises: a mean value for each feature; and a standard deviation of the mean value for each feature.

8. The computer-implemented method of claim 7, further comprising:
for each of the at least one statistical measure per feature:
determining a statistical measure difference by subtracting an individual statistical measure of the unlabeled query from another individual statistical measure of the labeled query; and
squaring the statistical measure difference;
summing the squared statistical measure differences for each of the at least one statistical measure per feature; and
taking the square root of the sum.

9. The computer-implemented method of claim 1, wherein the user labels the individual documents associated with the first query to reflect relevance of the documents associated with the first query to the first query.

10. The computer-implemented method of claim 1, further comprising: presenting the refined model to a search engine.

11. A computer-implemented method comprising:
storing an unlabeled query set comprising unlabeled queries and unlabeled documents associated with the unlabeled queries;
storing a labeled query set comprising labeled queries and labeled documents associated with the labeled queries, the labeled documents being labeled based on relevance to the associated labeled queries;
determining accuracy values for the labeled queries based on rankings of the associated labeled documents;
for individual unlabeled queries in the unlabeled query set:
determining similarity values reflecting similarities between features of the unlabeled documents associated with the individual unlabeled queries and corresponding features of the labeled documents associated with the labeled queries; and
determining weights for the individual unlabeled queries based on the similarity values and the accuracy values, and
selecting a new query from the unlabeled query set to present to a user for labeling based on the determined weights of the individual unlabeled queries; and
presenting the selected new query to the user for labeling of the documents associated with the selected new query.

12. The computer-implemented method of claim 11, wherein presenting the selected new query for labeling comprises:
assigning, by a human operator, a degree of relevance between the selected new query and the documents associated with the selected new query.

13. The computer-implemented method of claim 11, wherein the step of determining similarity values comprises:
determining distance values for labeled neighbor queries by comparing one or more aggregate feature values of each unlabeled query to one or more aggregate feature values of each labeled query.

14. The computer-implemented method of claim 13, wherein the step of determining accuracy values comprises:
using an information retrieval metric.

15. The computer-implemented method of claim 14, wherein the step of determining weights comprises:
multiplying the distance values by the accuracy values.

16. The computer-implemented method of claim 15, wherein the step of selecting a new query comprises:
selecting a predetermined number of queries, including the new query, having the lowest determined weights.

17. The computer-implemented method of claim 14, wherein the information retrieval metric is a normalized discounted cumulative gain metric or a mean average precision.

18. The computer-implemented method of claim 11, wherein the similarity values are determined by:
creating a matrix for each labeled query and each unlabeled query, each matrix having feature values on one dimension and document information on another dimension;
creating a vector for each matrix, individual vectors for the matrix corresponding to an individual labeled query or unlabeled query and having at least one statistical measure per feature summarizing the feature values for individual documents corresponding to each individual vector's corresponding labeled query or unlabeled query; and
determining the similarity values by comparing each labeled query's vector to each unlabeled query's vector.

19. A ranking function learning system comprising:
a data store having:
a set of queries, individual queries having a status of labeled or unlabeled;
a set of documents, individual documents associated with at least one query of the set of queries and having one or more feature values; and
a set of relevance relationships between the set of documents and the set of queries;

a modeling engine configured to rank an associated subset of associated documents returned in response to a received query based on a model; and a computer readable storage medium having computer-readable instructions for selecting new queries for sampling to refine of the modeling engine, the selecting process comprising:

for each individual unlabeled query of the set of queries,
- determining a similarity between individual documents associated with the individual unlabeled query and individual documents associated with individual labeled neighbor queries;
- determining an accuracy of the model for ranking the individual documents associated with the individual labeled neighbor queries;
- determining a weight of each individual unlabeled query based on the similarity and the accuracy of each individual labeled neighbor query;

selecting a new set of queries to be labeled based on the determined weight of each individual unlabeled query; and presenting the new set of queries to the user for labeling.

* * * * *